US012698851B2

(12) United States Patent
Nowak et al.

(10) Patent No.: US 12,698,851 B2
(45) Date of Patent: Aug. 4, 2026

(54) SYSTEM HAVING A DEVICE FOR PRODUCING A PIPELINE UNIT AND METHOD FOR PRODUCING A PIPELINE UNIT

(71) Applicant: Glatt Gesellschaft mit beschränkter Haftung, Binzen (DE)

(72) Inventors: Mirko Nowak, Lörrach (DE); Reinhard Nowak, Lörrach (DE)

(73) Assignee: Glatt Gesellschaft mit beschränkter Haftung, Binzen (DE)

( * ) Notice: Subject to any disclaimer, the term of this patent is extended or adjusted under 35 U.S.C. 154(b) by 0 days.

(21) Appl. No.: 18/283,134

(22) PCT Filed: Mar. 17, 2022

(86) PCT No.: PCT/EP2022/056941
§ 371 (c)(1),
(2) Date: Sep. 20, 2023

(87) PCT Pub. No.: WO2022/200159
PCT Pub. Date: Sep. 29, 2022

(65) Prior Publication Data
US 2024/0167590 A1 May 23, 2024

(30) Foreign Application Priority Data
Mar. 24, 2021 (DE) .................... 10 2021 202 883.7

(51) Int. Cl.
*F16L 13/14* (2006.01)
*B21D 39/04* (2006.01)
(52) U.S. Cl.
CPC .......... *F16L 13/147* (2013.01); *B21D 39/046* (2013.01); *F16L 2013/145* (2013.01)

(58) Field of Classification Search
CPC . F16L 13/147; F16L 2013/145; F16L 13/146; F16L 13/166; B21D 39/046; B23P 11/005
See application file for complete search history.

(56) References Cited

U.S. PATENT DOCUMENTS

| | | |
|---|---|---|
| 2,381,747 A | 8/1945 | Howe |
| 3,019,520 A | 2/1962 | Woolley |
| 3,641,798 A | 2/1972 | Press |
| 7,086,131 B2 | 8/2006 | Gibb et al. |
| 10,591,097 B2 | 3/2020 | Nahrwold et al. |

(Continued)

FOREIGN PATENT DOCUMENTS

| | | |
|---|---|---|
| CN | 101865336 A | 10/2010 |
| CN | 107345605 A | 11/2017 |

(Continued)

OTHER PUBLICATIONS

English Translation of the Descriptive portion of DE-3302762-A1, Retrived from the EPO on Dec. 3, 2024, URL: https://worldwide.espacenet.com/publicationDetails/description?CC=DE&NR=3302762A1&KC=A1&FT=D&ND=3&date=19840216&DB=EPODOC&locale=en_EP.*

*Primary Examiner* — Matthew Troutman
*Assistant Examiner* — James A Linford
(74) *Attorney, Agent, or Firm* — The Webb Law Firm

(57) ABSTRACT

A system having a device for producing a pipeline unit from a pipeline having a pipeline outer surface and a pipe connector having a pipe connector outer surface. Also described is a method for producing the system.

6 Claims, 9 Drawing Sheets

(56) References Cited

U.S. PATENT DOCUMENTS

| | | | |
|---|---|---|---|
| 2007/0272417 A1 | 11/2007 | Benson | |
| 2007/0283741 A1* | 12/2007 | Bernstorf | B21D 39/046 |
| | | | 72/416 |
| 2008/0022748 A1* | 1/2008 | Feliciano | B21D 39/046 |
| | | | 72/409.19 |
| 2011/0215573 A1 | 9/2011 | Tanaka et al. | |
| 2012/0139236 A1 | 6/2012 | Novitsky et al. | |
| 2014/0361535 A1 | 12/2014 | Lutz et al. | |

FOREIGN PATENT DOCUMENTS

| | | | | |
|---|---|---|---|---|
| CN | 208331500 U | | 1/2019 | |
| DE | 484005 | | 10/1929 | |
| DE | 2126433 | | 12/1971 | |
| DE | 3302762 A1 | * | 2/1984 | |
| DE | 202010005876 U1 | | 9/2011 | |
| DE | 202020100379 U1 | | 2/2021 | |
| EP | 3255331 A1 | | 12/2017 | |
| FR | 5702 | | 6/1906 | |
| GB | 504072 A | * | 4/1939 | |
| GB | 2561839 A | | 10/2018 | |
| JP | 5316777 | | 2/1978 | |
| JP | 2003245740 A | | 9/2003 | |
| JP | 200952539 A | | 3/2009 | |
| JP | 2011620 A | | 1/2011 | |
| KR | 101523307 B1 | | 5/2015 | |
| WO | WO-9738279 A1 | * | 10/1997 | B23P 11/005 |

* cited by examiner

A-A

B-B

SYSTEM HAVING A DEVICE FOR PRODUCING A PIPELINE UNIT AND METHOD FOR PRODUCING A PIPELINE UNIT

CROSS-REFERENCE TO RELATED APPLICATIONS

This application is the United States national phase of International Application No. PCT/EP2022/056941 filed Mar. 17, 2022, and claims priority to German Patent Application No. 10 2021 202 883.7 filed Mar. 24, 2021, the disclosures of which are hereby incorporated by reference in their entireties.

BACKGROUND

Field

The invention relates to a system having a device for producing a pipeline unit from a pipeline having a pipeline outer surface and a pipe connector having a pipe connector outer surface.

Description of Related Art

Furthermore, the invention relates to a method for producing a pipeline unit.

Up to now, pressurized pipeline arrangements according to DIN 11864-3 have been produced by means of grooved and flanged clamp fittings, wherein these are respectively welded to one end of the pipeline. The weld seams of the pressurized pipeline arrangement then have to be extensively retreated and tested. A seal, in particular an O-ring, is inserted into the grooved clamp fitting. A clamping device connects the grooved and flanged clamp fitting, wherein a mechanical stop arranged on the grooved clamp fitting ensures that the O-ring is pressed on in a defined manner. The contact pressure causes the O-ring to be partially pressed out of the groove such that a defined transition is formed between the grooved and flanged clamp fitting inside the pipeline arrangement.

According to a further pipeline arrangement produced according to DIN 32676, this is produced by two weld-on sockets receiving a seal. One drawback of this pipeline arrangement is that the weld seams of the pressurized pipeline arrangement then have to be extensively retreated and tested. It is also disadvantageous that the seal has no defined contact pressure; rather, this is determined by the clamping device.

It is also known to roll pipe connectors onto pipelines and secure the pipe connectors accordingly against twisting. A related method is disclosed in the patent specification DE 484 005 A. For this purpose, holes or cavities in the inner wall are provided at individual points of the pipe section of the pipe connector, into which the pipeline engages with bulges pressed out from the inside.

SUMMARY

The object of the invention is therefore to provide a system having a device for producing a pipeline unit and a method for producing a pipeline unit.

This object is achieved with a system of the type mentioned in the introduction by virtue of the fact that the device has an annularly structured stress-relieving device having a longitudinal central axis and a radially inwardly pointing stress-relieving device inner surface, wherein the stress-relieving device inner surface is adapted to the pipeline outer surface and/or the pipe connector outer surface in order to at least partially receive the pipeline unit to be produced in an operating state, and the stress-relieving device surrounds a pressure tool in the operating state so as to support the pipeline unit to be produced in the operating state when the pipeline is expanded by the pressure tool. The pipeline unit, in particular the pipeline and/or the pipe connector, is advantageously supported by the system when the pipeline is expanded by the pressure tool, expediently a rolling tool, so that a connection of the pipeline unit and pipe connector to the pipeline unit is improved. In the simplest case, the system only consists of the stress-relieving device.

The system expediently has the pipeline unit having the pipeline and the pipe connector.

The system further expediently also has the pressure tool for expanding the pipeline.

According to an additional advantageous embodiment of the system, the stress-relieving device inner surface is stepped. This makes it possible to adapt the stress-relieving device inner surface to a wide variety of contours and/or surfaces of a pipeline unit produced from a pipeline and a pipe connector.

Moreover, in a preferred embodiment of the system, the stress-relieving device has a stress-relieving device annular body, which has two annular body elements that together form the stress-relieving device inner surface, which elements respectively have a first end section and a second end section, wherein the first end sections are arranged pivotally moveable with respect to one another, and wherein a connection element is arranged on each second end section and the connection elements are suitable for interacting with one another in order to releasably connect the second end sections. Such a preferred embodiment has the advantage that the stress-relieving device can be easily arranged on the pipeline and pipe connector.

The stress-relieving device inner surface further preferably has at least one annular groove for at least partially receiving the pipe connector. The annular groove positions the pipe connector and thus, at least indirectly, the pipeline axially and holds it in this position.

It is accordingly advantageous that the stress-relieving device forms an annular projection projecting radially inwards, which is delimited on one side by a first axial stress-relieving device end face and on the other side by a lateral groove boundary surface of the at least one annular groove facing away from the first axial stress-relieving device end face. According to a related embodiment of the system, the annular projection projecting radially inwards projects radially inwards to such an extent that the annular projection forms a stop for the pipeline inserted into the pipe connector. The annular projection projecting radially inwards and formed as a stop enables the simple positioning and/or fixing of the pipeline whilst the pipeline is expanded by the pressure tool.

In addition, according to an additional preferred embodiment of the system, the stress-relieving device has a second axial stress-relieving device end face opposite the first axial stress-relieving device end face, which is stepped, which forms an annular stress-relieving device collar radially supporting the pipeline inserted into the flange. This provides additional improved support for the pipeline through the stress-relieving device.

Furthermore, this object is achieved with a method of the type mentioned in the introduction by virtue of the fact that for producing a pipeline unit using a system as described herein, the method steps of providing a pipeline, providing a pipe connector, arranging the pipe connector on the pipeline, providing a stress-relieving device, inserting the pipeline unit to be produced from pipeline and pipe connector into the stress-relieving device and closing the stress-relieving device, providing a pressure tool, inserting the pressure tool into the pipeline such that the stress-relieving device surrounds the pressure tool in the operating state, expanding the pipeline to connect the pipeline and pipe connector by means of an interference fit to the pipeline unit, removing the pressure tool from the pipeline and opening the stress-relieving device and removing the pipeline unit produced from pipeline and pipe connector, are comprised. The system, in particular the pipe connector, is advantageously supported thanks to the method when the pipeline is expanded by the pressure tool so that a connection of the pipeline unit and pipe connector to the pipeline unit is improved.

BRIEF DESCRIPTION OF THE DRAWINGS

The terms Fig., Figs., Figure, and Figures are used interchangeably in the specification to refer to the corresponding figures in the drawings.

The invention is explained in more detail below based on the appended drawing, in which.

DETAILED DESCRIPTION

Figure 1:
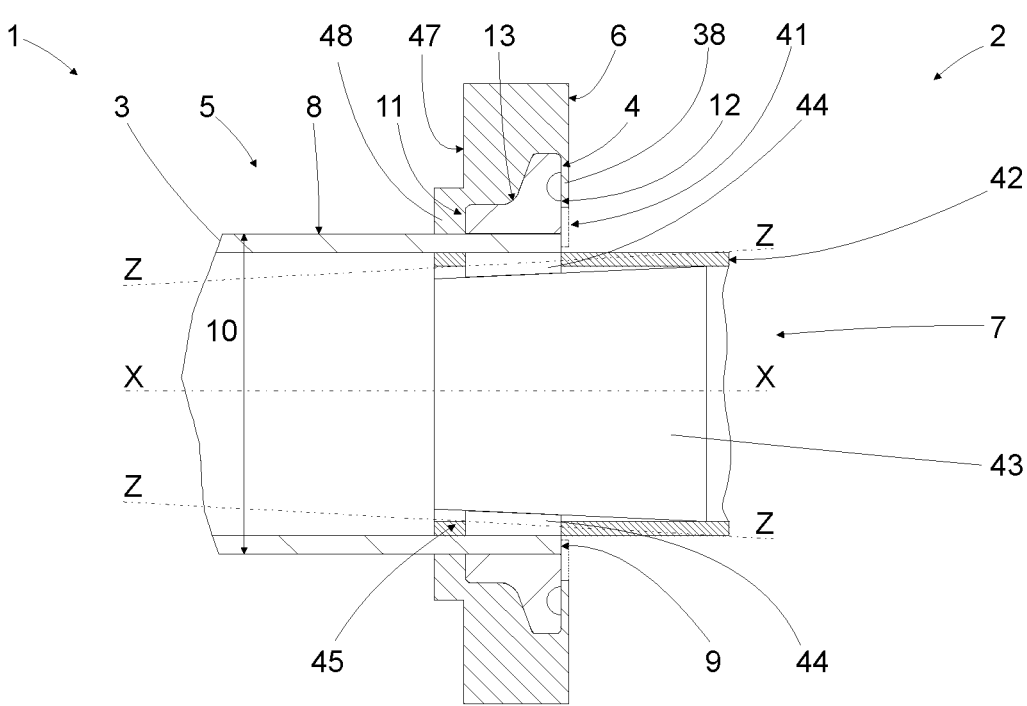
FIG. 1 shows a sectional view of an embodiment of a system having a device for producing a pipeline unit.
Figure 2:
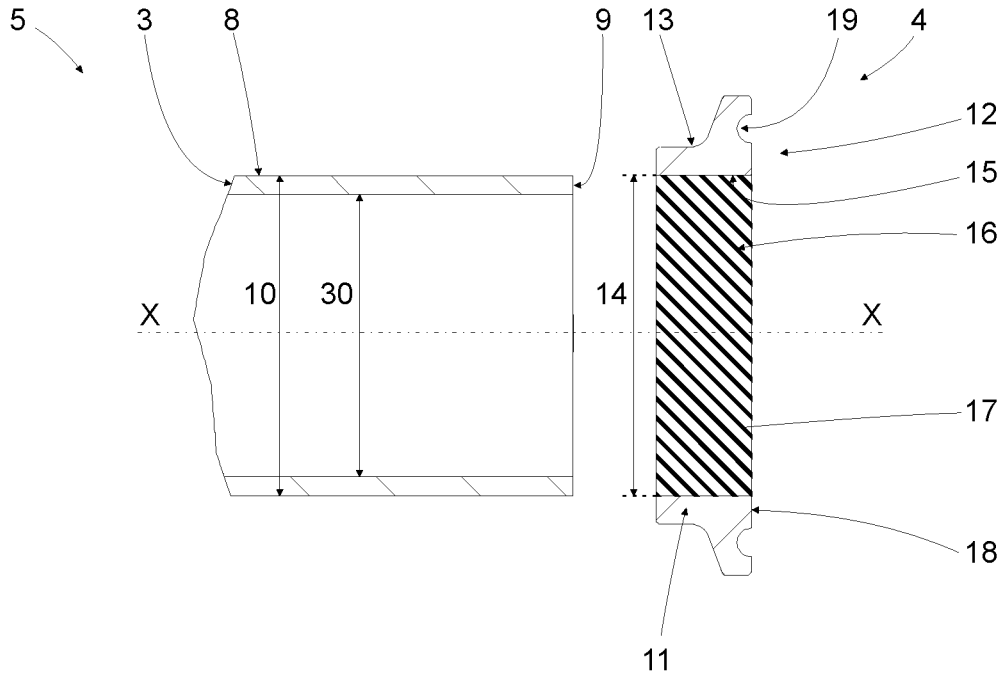
FIG. 2 shows a sectional view of a pipeline unit to be produced by radially expanding a pipeline consisting of a pipeline and a pipe connector.
Figure 3:
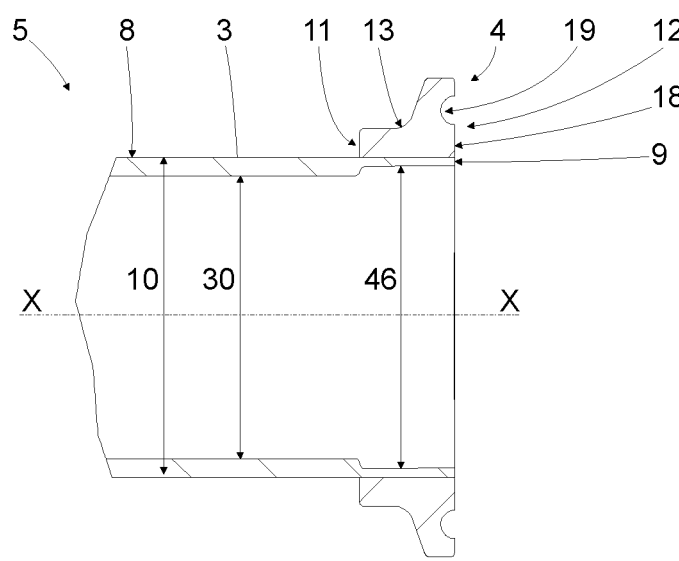
FIG. 3 shows a sectional view of the pipeline unit shown in FIG. 2 produced by radially expanding the pipeline consisting of a pipeline and a pipe connector.
Figure 4:
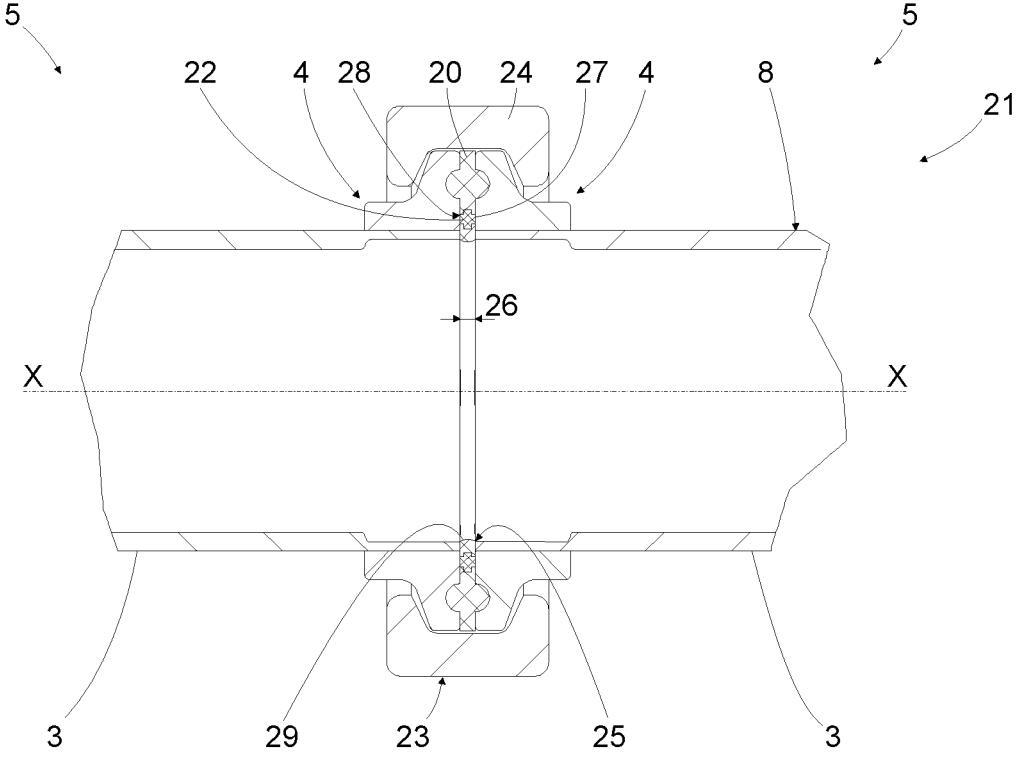
FIG. 4 shows a sectional view of a pipeline arrangement having two pipeline units.
Figure 5:
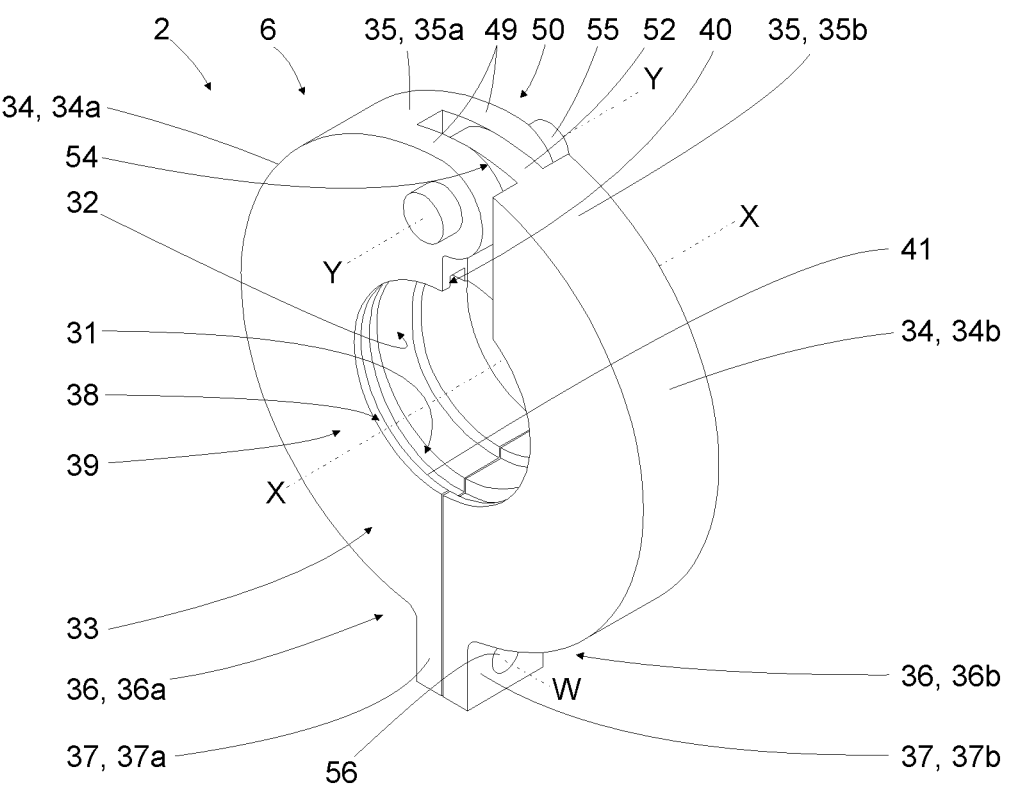
FIG. 5 shows a perspective view of an embodiment of a stress relieving device in a closed state.
Figure 6:
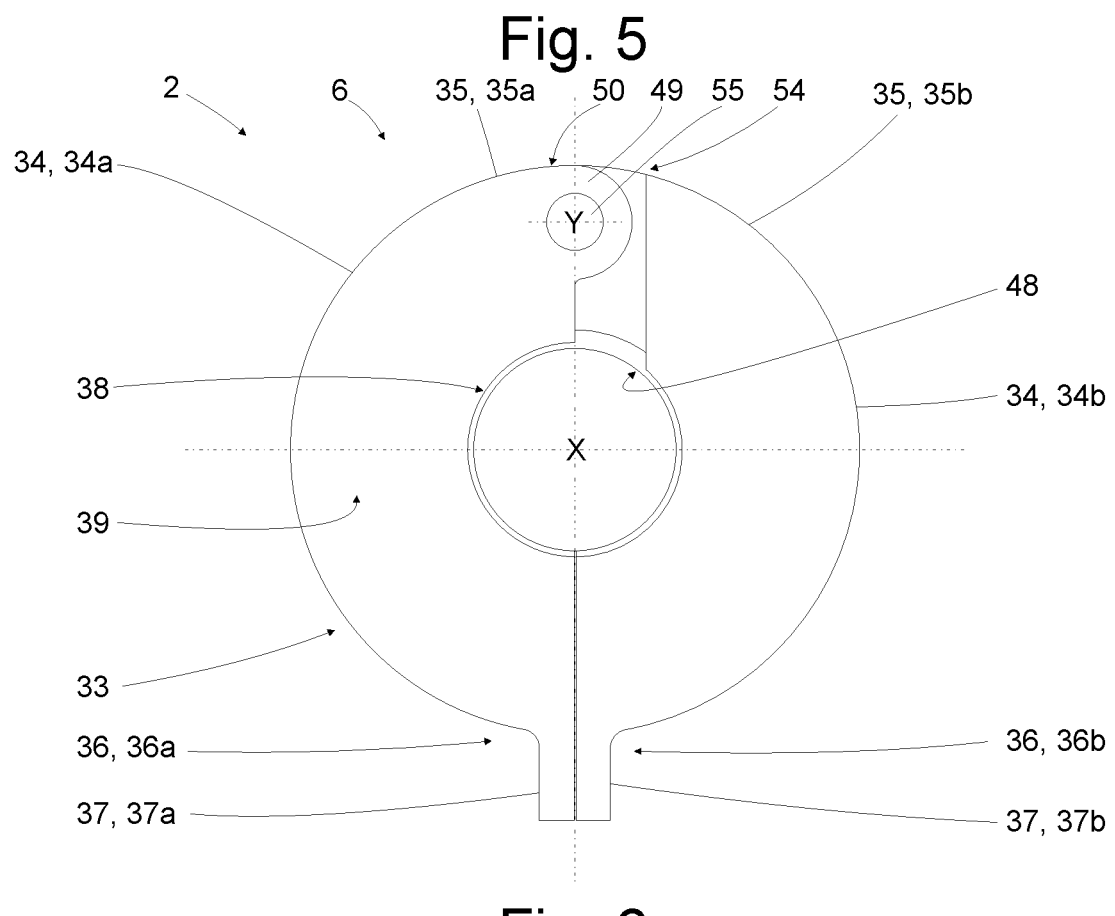
FIG. 6 shows a front view of the stress-relieving device illustrated in FIG. 5.
Figure 7:
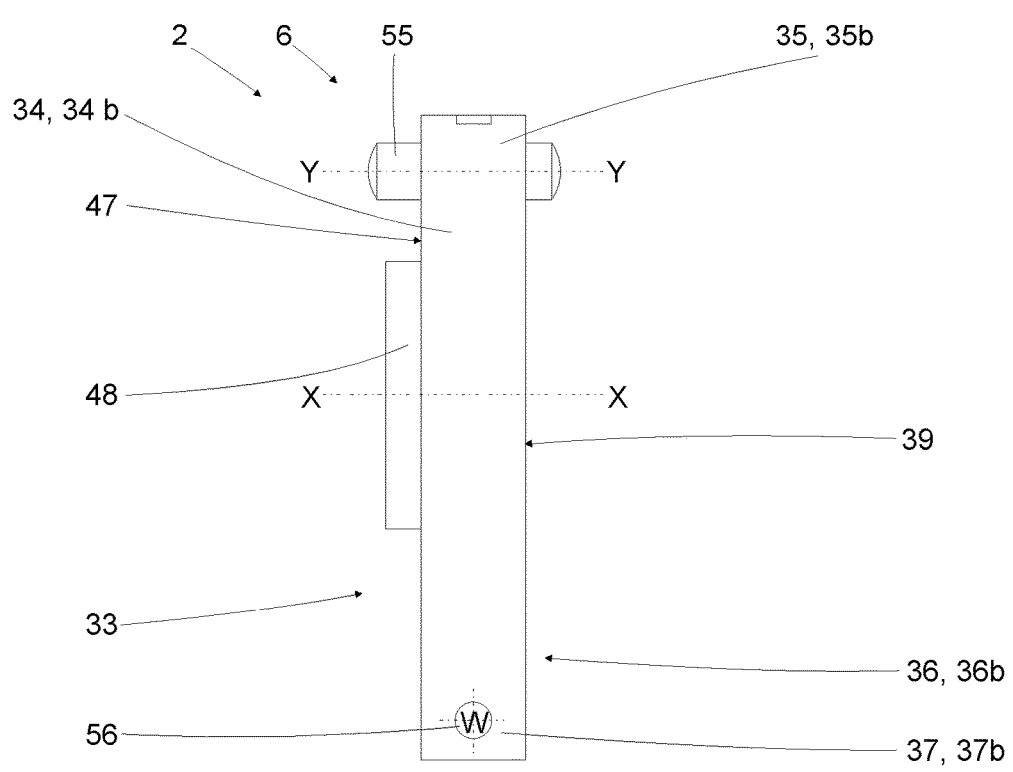
FIG. 7 shows a side view from the right of the stress-relieving device illustrated in FIG. 5.
Figure 8:
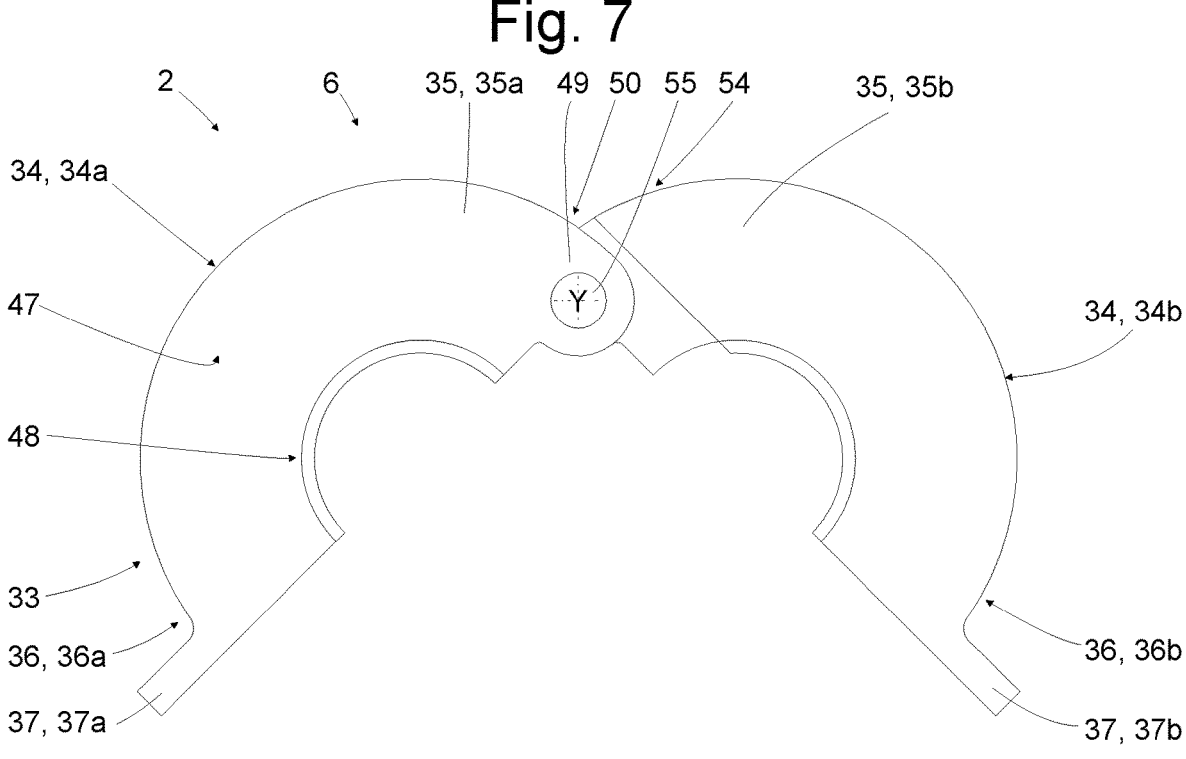
FIG. 8 shows a rear view of the stress-relieving device shown in FIG. 5 in an open state.
Figure 9:
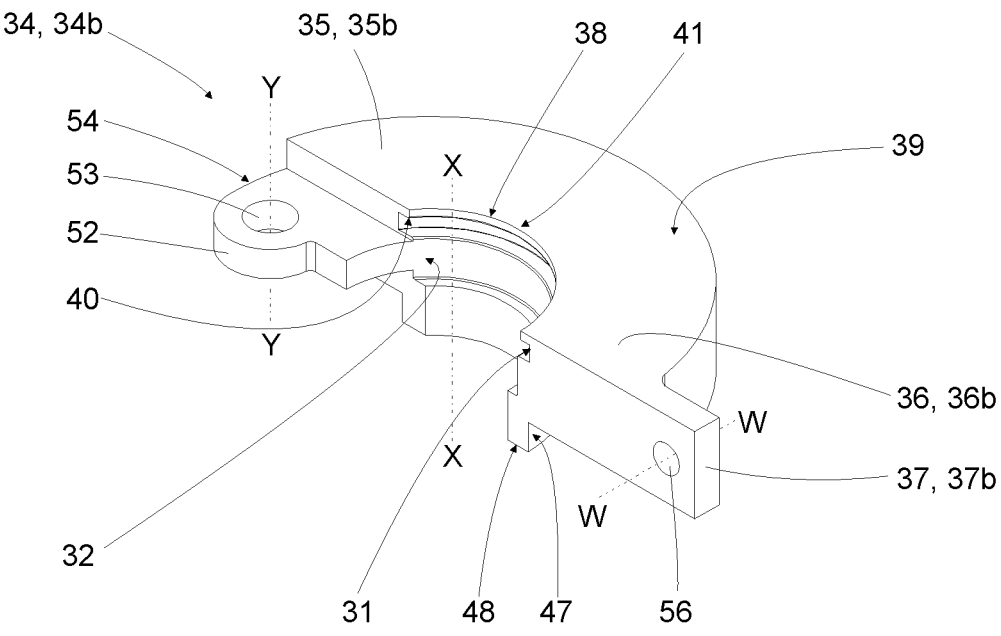
FIG. 9 shows a perspective view of a first annular body element of the stress-relieving device illustrated in FIG. 5.
Figure 10:
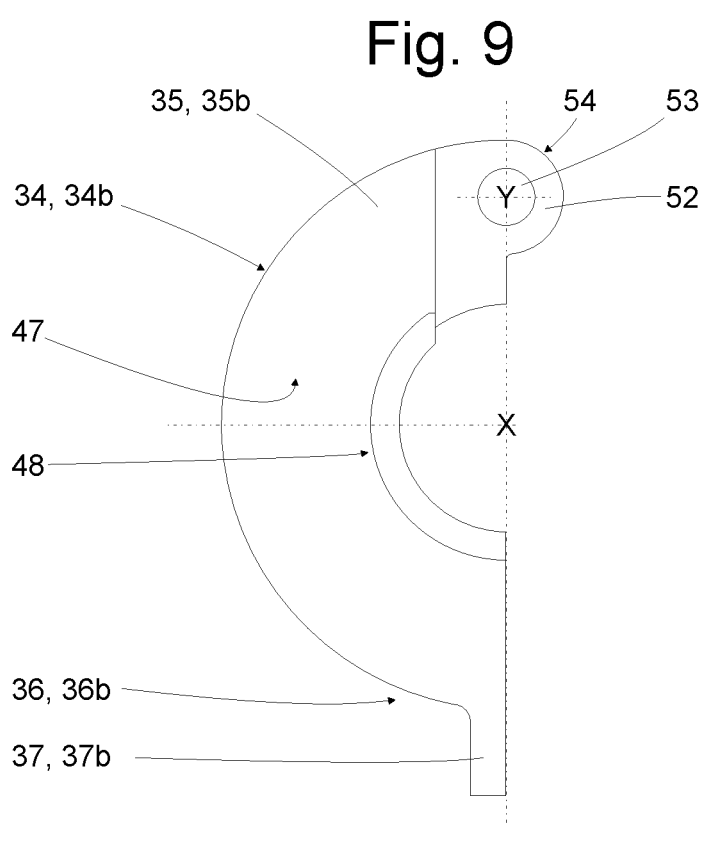
FIG. 10 shows a rear view of the first annular body element shown in FIG. 9.
Figure 11:
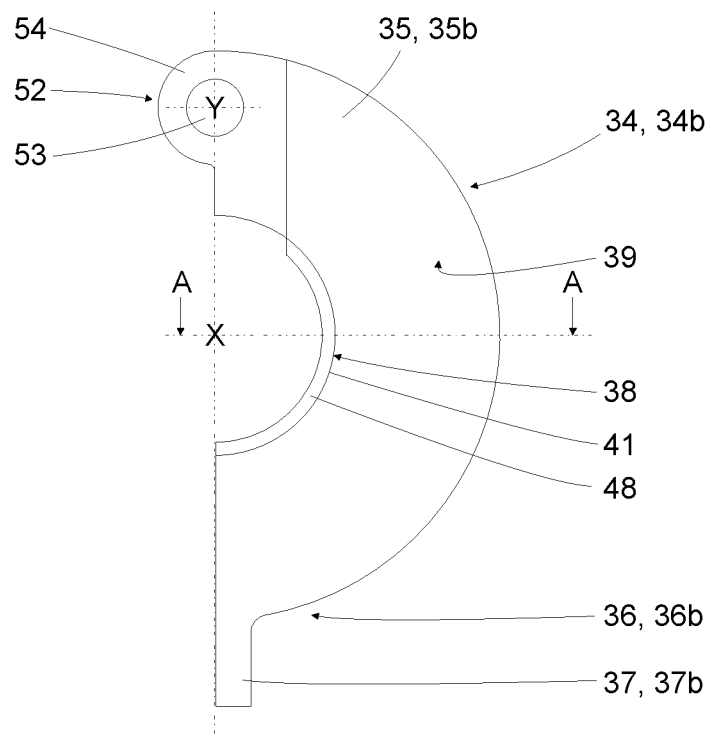
FIG. 11 shows a front view of the first annular body element shown in FIG. 9.
Figure 12:
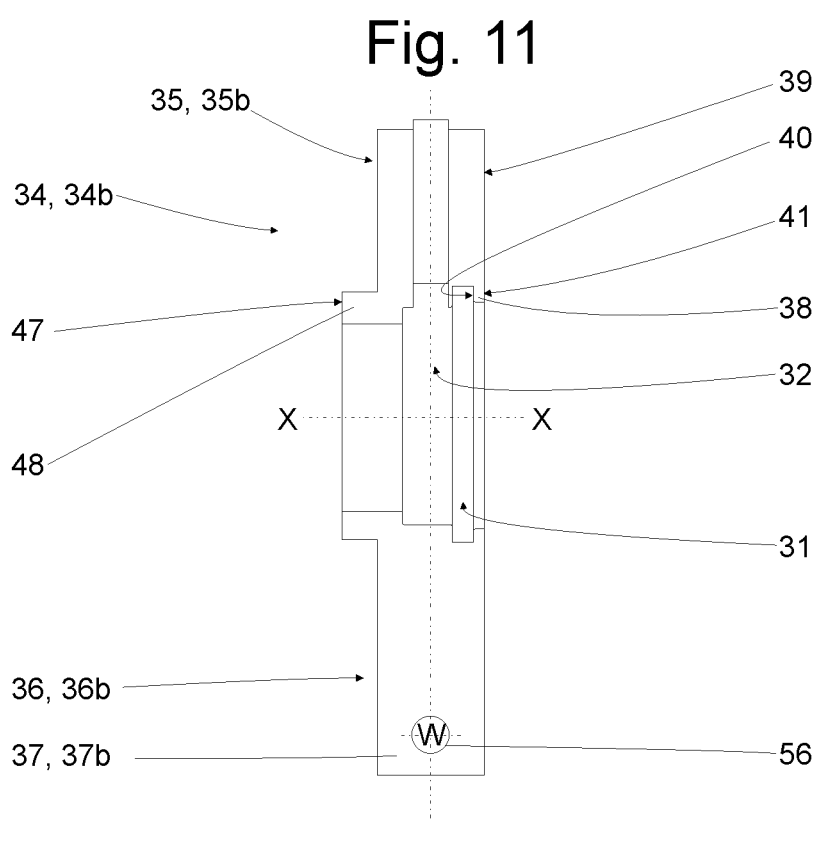
FIG. 12 shows a side view from the left of the annular body element shown in FIG. 9.

Unless otherwise stated, the following description relates to all embodiments illustrated in the drawing of a system 1 having a device 2 for producing a pipeline unit 5 having a pipeline 3 and a pipe connector 4.

In the embodiment shown, the system 1 having the device 2 for producing the pipeline unit 5 has the pipeline 3, the pipe connector 4, a stress-relieving device 6 and a pressure tool 7, which is expediently designed as a rolling tool. The pipeline 3, the pipe connector 4, the stress-relieving device 6 and the pressure tool 7 have a longitudinal central axis X-X and are aligned therewith in the operating state.

The pipeline 3 has a pipeline outer surface 8, a pipeline end face 9 and a pipeline outer diameter 10. In addition, the pipeline 3 is designed according to a specification in relation to a pipe length and a pipe bend, wherein a straight pipeline 3 is used in the embodiment.

The pipe connector 4 has a pipe section 11 and a flange section 12 and has a pipe connector outer surface 13, a pipe connector inner diameter 14 and a pipe connector inner surface 15. A structure 16 in the form of protrusions 17 is formed on the pipe connector inner surface 15. In other embodiments (not shown), the pipeline outer surface 8 and/or the pipe connector inner surface 15 is/are at least partially structured prior to the radial expansion of the pipeline 3. The structure 16 does not necessarily have to be in the form of protrusions 17, but can also, for example, be in the form of recesses, grooves, slots or the like. Thanks to the structure 16 arranged on the pipe connector inner surface 15, the expansion of the pipeline 3 also produces, in addition to a force-fit connection, a form-fitting connection between the pipeline 3 and pipe connector 4.

Moreover, the flange section 12 of the pipe connector 4 has a flange section end face 18, wherein a groove 19 for partially receiving a seal 20 is formed in the flange section end face 18.

In the embodiment shown, the pipeline outer diameter 10 of the pipeline 3 and the pipe connector inner diameter 14 of the pipe connector 4 are substantially the same size.

In another embodiment (not shown), the pipeline outer diameter 10 of the pipeline 3 is larger, expediently minimally larger than the pipe connector inner diameter 14 of the pipe connector 4. An interference fit is thus created directly when the pipe connector 4 is fitted axially onto the pipeline 3. Such an interference fit creates a force-fit connection between the pipeline 3 and the pipe connector 4.

Prior to fitting the pipe connector 4 onto the pipeline 3, the pipe connector 4 is preferably heated and/or the pipeline 3 is preferably cooled. Cooling of the pipe connector 4 and/or heating of the pipeline 3 can also be carried out in this context.

A pipeline arrangement 21 has two pipeline units 5 respectively comprising a pipe connector 4 fitted axially onto a pipeline 3, wherein a seal 20 having a seal insert 22 is arranged axially between the pipeline units 5.

In the embodiment, the two pipeline units 5 of the pipeline arrangement 21 are axially clamped together by means of a clamping device 23. For this purpose, the flange sections 12 of the pipe connectors 4 of the two pipeline units 5 are axially clamped together by means of the clamping unit 23. In the embodiment, the clamping device 23 is expediently designed as an articulated clamp 24. The clamping device 23 designed as an articulated clamp 24 can additionally adjust the contact pressure forces acting on the seal 20, which correspond to a contact pressure in relation to the surface, for example by means of a wing nut or the like closing the articulated clamp 24.

Alternatively, standard parts, such as measuring instruments, valves and flaps or the like, can also serve as a pre-formed pipeline unit 5 and form a pipeline arrangement 21 together with another second pipeline unit 5 according to the embodiment.

The pipeline arrangement 21 has a seal 20 axially arranged between the flange section end faces 18 of the pipe connectors 4 formed on the flange sections 12. The seal 20 is configured to form a defined transition 25 between the two pipeline units 5 clamped together. The defined transition 25 is formed by the contact forces acting on the seal 20 during clamping.

The defined transition 25 reduces or prevents the accumulation of residues or accumulation of solids of the medium flowing through the pipeline arrangement 21 or of the media flowing through the pipeline arrangement 21.

In addition, the seal 20 has a seal insert 22. The seal insert 22 defines a minimum axial distance 26 between the two pipeline units such that the two pipeline units 5 are subjected to contact pressure forces when the pipeline arrangement 21 is clamped, which forces are determined by the minimum axial distance 26 established due to the seal insert 22.

The seal 20 is preferably designed as a flat seal, wherein materials such as elastomers, compressed fibre, aramid fibre, carbon fibre, mineral fibre, metal, copper are available as sealing materials. Jacketed gaskets 20, in particular jacketed flat gaskets, are also preferred, wherein these comprise a core (any flat gasket material, e.g., fibre composite, PTFE, etc.) encased in a PTFE or metal jacket, preferably steel or corrosion-resistant nickel alloys. The jacket protects the core against chemical attack from the medium to be sealed.

The seal insert 22 of the seal 20 has a seal insert end face 28 formed as a seal stop 27. A minimum axial distance 26 can be or is thus defined between the two pipeline units 5 thanks to the seal unit 22. The pipeline end faces 9 and/or the flange section end faces 18 adjoin the seal insert end faces 28 of the seal insert 22 of the seal 20 in the clamped state of the pipeline arrangement 21. This precisely adjusts the minimum distance 26 between the two pipeline units 5 of the pipeline arrangement 21 and thus also the contact pressure forces acting on the seal 20.

The transition 25 defined by the contact pressure forces established by means of the seal insert 22 is preferably designed such that the bulge 29 forms an obtuse angle a with respect to an expanded pipeline inner diameter 30. The obtuse angle a particularly preferably has an angle a between 100° and 170°, very particularly preferably between 120° and 150°. This ensures that residues of the medium flowing through the pipeline arrangement 21 or of the media flowing through the pipeline arrangement 21 are reduced or prevented.

Figure 13:
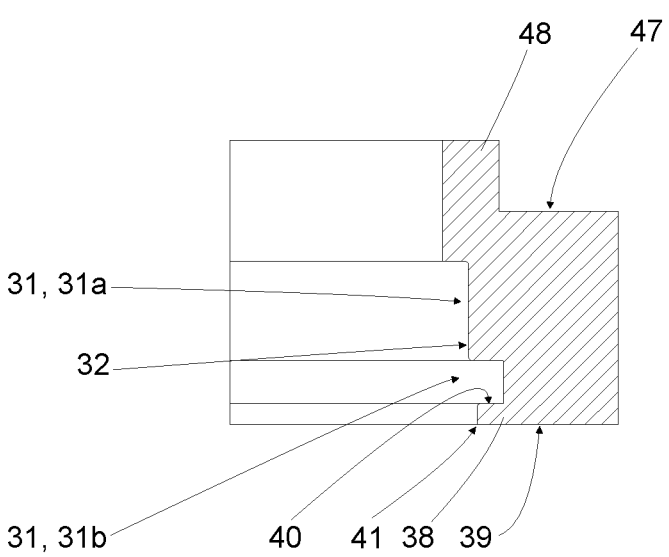
FIG. 13 shows a sectional view of the first annular body element along section A-A.
Figure 14:
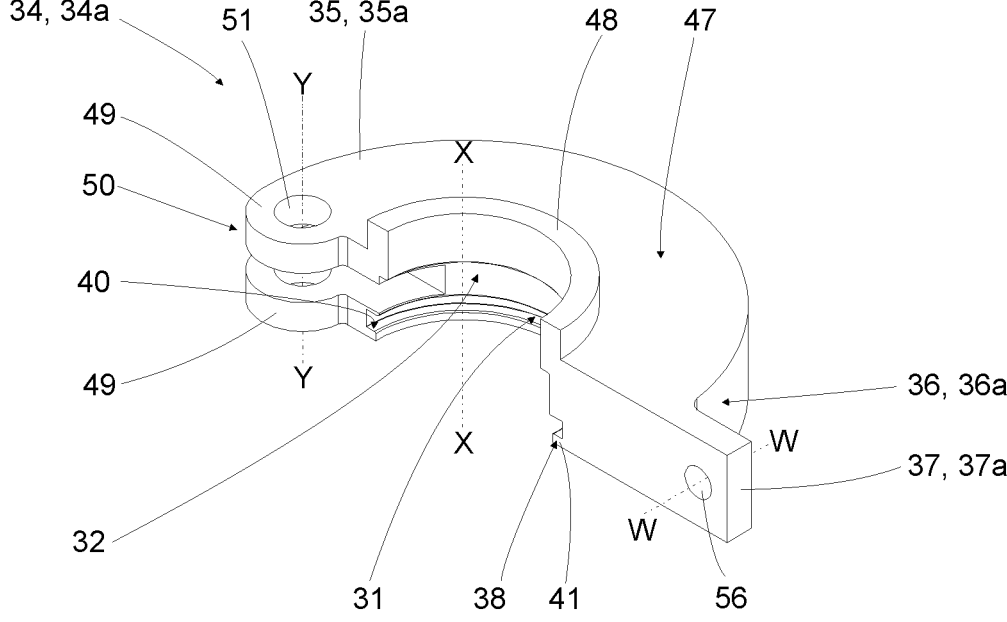
FIG. 14 shows a perspective view of a second annular body element of the stress-relieving device illustrated in FIG. 5.
Figure 15:
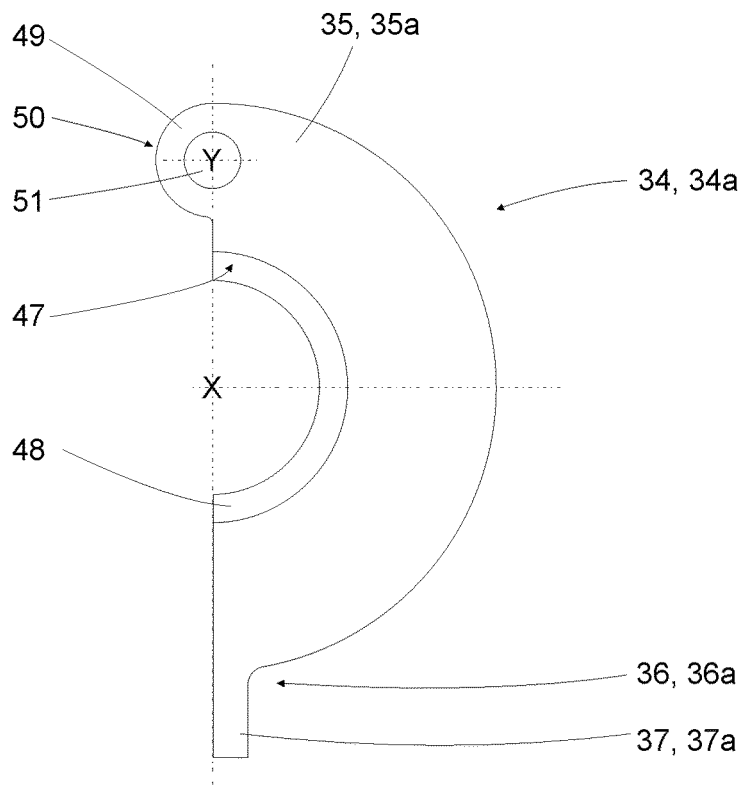
FIG. 15 shows a rear view of the second annular body element illustrated in FIG. 14 of the stress-relieving device illustrated in FIG. 5.
Figure 16:
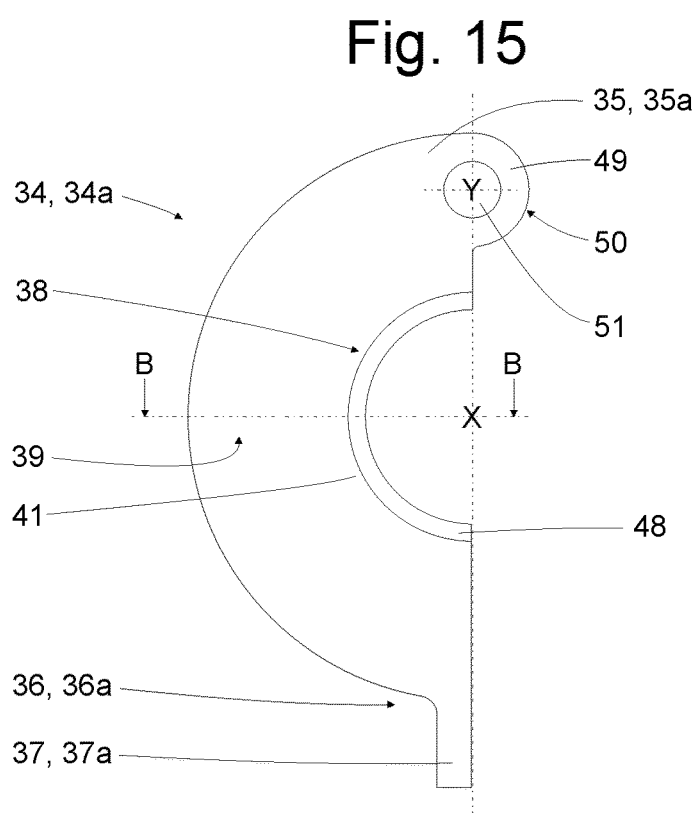
FIG. 16 shows a front view of the second annular body element illustrated in FIG. 14
Figure 17:
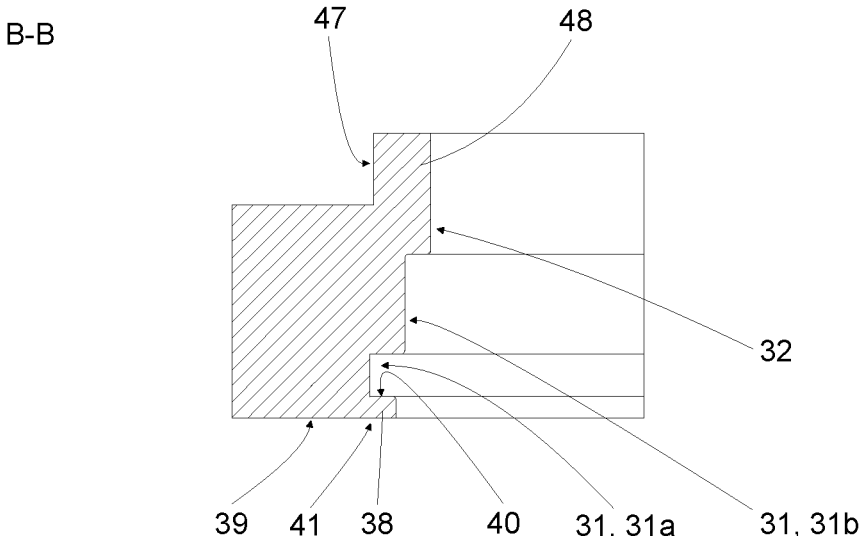
FIG. 17 shows a side view of a partial section of the second annular body element illustrated in FIG. 14.

The device 2 has an annularly structured stress-relieving device 6 having a longitudinal central axis X-X. The stress-relieving device 6 has at least one annular groove 31, whereby a radially inwardly pointing stress-relieving device inner surface 32 is stepped for at least partially receiving the pipeline unit 5 to be produced, but in particular at least the pipe connector 4, in the operating state. The stress-relieving device inner surface 32 is therefore expediently adapted to the pipeline outer surface 8 and/or the pipe connector outer surface 13. In the embodiment shown, the stress-relieving device has two annular grooves 31a and 31b stepped with respect to one another, as can be best seen in FIGS. 13 and 17. The annular groove 31a is suitable for receiving the pipe section 11, and the annular groove 31b is suitable for receiving the flange section 12 of the pipe connector 4.

The stress-relieving device 6 has a stress-relieving device annular body 33, which has two annular body elements 34 that together form the stress-relieving device inner surface

32. The annular body elements 34 respectively have a first end section 35 and a second end section 36, wherein the first end sections 35 are arranged pivotally moveable with respect to one another about a pivot axis Y-Y. The pivot axis Y-Y runs parallel to the longitudinal central axis X-X. A connection element 37 is arranged on each second end section 36, which are suitable for interacting with one another in order to releasably connect the second end sections 36. Each connection element 37 has a connection hole 56 having a bearing hole central axis W-W. The two connection elements 37 are connected to one another by means of a locking element, for example a screw connection, a split pin or the like, which is not shown and arranged in the two aligned connection holes 56. As a result, the two connection elements 37a and 37b interact. For better differentiation, the references for the annular body elements 34, the first and second end sections 35, 36 and the connection elements 37 are respectively marked with the lower-case letters a or b.

In addition, the stress-relieving device 6 forms an annular projection 38 projecting radially inwards, which is delimited on one side by a first axial stress-relieving device end face 39 and on the other side by a lateral groove boundary surface 40 of the at least one annular groove 31 facing away from the first axial stress-relieving device end face 39. The annular projection 38 projecting radially inwards expediently projects radially inwards to such an extent that the annular projection 38 forms a stop 41 for the pipeline 3 inserted into the pipe connector 4. This ensures that the pipeline end face 9 and flange section end face 18 are flush with one another during expansion by the pressure tool 7.

The annular body element 34a has a bearing yoke 50 in the region of the first end section 35a, which has two bearing legs 49. Each bearing leg 49 has a bearing hole 51, which are flush with one another owing to the pivot axis Y-Y serving as a bearing hole central axis.

In contrast to the annular body element 34a, the annular body element 34b in the region of the first end section 35b has a bearing eye 54 having a bearing hole 53 arranged in a bearing body 52. The bearing hole 53 also has the pivot axis Y-Y as the bearing hole central axis.

The two annular body elements 34a and 34b arranged pivotally moveable to one another about the pivot axis Y-Y are connected to one another in the embodiment shown via a bearing pin 55, which can be designed as a split pin, for example.

The stress-relieving device 6 surrounds the pressure tool 7 in the operating state so as to support the pipeline unit 5 to be produced in the operating state when the pipeline 3 is expanded by the pressure tool 7. For this purpose, the pressure tool 7 has a conically shaped pressure mandrel 43, which is arranged in a housing 42 and can be displaced in the axial direction of the longitudinal central axis X-X. A ring 45 having force transmission elements 44, in particular force transmission rollers, surrounds the pressure mandrel 43 in the circumferential direction and rotates about the pressure mandrel 43 and the longitudinal central axis X-X in the operating state. The force transmission elements 44 are also rotatably mounted on an axis of rotation Z-Z in the ring 45. Due to the axial displacement of the pressure mandrel 43, the force transmission elements 44 are pressed radially outwards and expand the pipeline 3 through their simultaneous rotation about the axis of rotation Z-Z. In the embodiment, the expansion of the pipeline 3 results in a reduction in the pipeline wall thickness, forming the pipeline unit 5.

The radial expansion is achieved by means of the pressure tool 7, expediently the rolling tool, and is also referred to as the tube expansion of the pipeline 3. Following the radial expansion, a cross-sectional area of the pipeline 3 in the region of the expansion is larger than an original cross-sectional area of the pipeline 3. Thus, as a result of the radial expansion of the pipeline 3, the expanded pipeline inner diameter 46 in the region of an overlap of pipeline 3 and pipe connector 4 is larger than the original pipeline inner diameter 30.

In the embodiment shown, the stress-relieving device 6 moreover has a second axial stress-relieving device end face 47 opposite the first axial stress-relieving device end face 39, wherein the stress-relieving device end face 47 is stepped, which forms an annular stress-relieving device collar 48 radially supporting the pipeline 3 inserted into the pipe connector 4. The stress-relieving device collar 48 is designed to further support the pipeline 3 of the pipeline unit 5 to be produced in the operating state when the pipeline 3 is expanded by the pressure tool 7.

The method for producing a pipeline unit 5 using a system 1 comprises as preparatory method steps providing a pipeline 3, providing a pipe connector 4 and subsequently arranging the pipe connector 4 on the pipeline 3. The device 2 having the stress-relieving device 6 is then provided, which device receives the pipeline unit 5 to be produced from pipeline 3 and pipe connector 4 before the stress-relieving device is closed. The pressure tool 7 provided is subsequently inserted into the pipeline 3 such that the stress-relieving device 6 at least partially surrounds the pressure tool 7 in the operating state. The pipeline 3 is now expanded by the pressure tool 7 to produce the pipeline unit 5 from pipeline 3 and pipe connector 4 by means of an interference fit and to connect the pipeline 3 and pipe connector 4 by means of tube expansion. Finally, the pressure tool 7 is removed from the pipeline 3 and the stress-relieving device 6 is opened, whereby the pipeline unit produced from pipeline 3 and pipe connector 4 can be removed.

The invention claimed is:

1. A system having a device for producing a pipeline unit from a pipeline having a pipeline outer surface and a pipe connector having a pipe connector outer surface, wherein the device comprises an annularly structured stress-relieving device having a longitudinal central axis and a radially inwardly pointing stress-relieving device inner surface, wherein the stress-relieving device inner surface is adapted to the pipeline outer surface and/or the pipe connector outer surface in order to at least partially receive the pipeline unit to be produced in an operating state, and the stress-relieving device surrounds a pressure tool in the operating state so as to support the pipeline unit to be produced in the operating state when the pipeline is expanded by the pressure tool, wherein the stress-relieving device has a stress-relieving device annular body, which has two annular body elements that together form the stress-relieving device inner surface, which elements respectively have a first end section and a second end section, wherein the first end sections are arranged pivotally moveable with respect to one another about a pivot axis, wherein a connection element is arranged on each second end section and the connection elements are configured to interact with one another in order to releasably connect the second end sections, wherein the stress-relieving device inner surface has at least one annular groove for at least partially receiving the pipe connector, wherein the stress-relieving device forms an annular projection projecting radially inwards, which is delimited on one side by a first axial stress-relieving device end face and on the other side by a lateral groove boundary surface of the at least one annular groove facing away from the first axial stress-relieving device end face, wherein the stress-relieving device has a second axial stress-relieving device end face opposite the first axial stress-relieving device end face, which is stepped, which forms an annular stress-relieving device collar radially supporting the pipeline inserted into the pipe connector, wherein the annular projection projecting radially inwards projects radially inwards to such an extent that the annular projection forms a stop for abutting a longitudinal outermost end face of the pipeline inserted into the pipe connector.

2. The system according to claim 1, wherein the system further comprises the pipeline unit having the pipeline and the pipe connector.

3. The system according to claim 1, wherein the stress-relieving device inner surface is stepped.

4. The system according to claim 1, wherein each of the connection elements arranged on the respective second end sections comprises a connection hole having a bearing hole central axis.

5. The system according to claim 4, wherein the connection hole on each of the respective second end sections are configured to be aligned with one another to create aligned connection holes, and the connection elements are connected to one another by a locking element arranged in the aligned connection holes.

6. The system according to claim 1, wherein the stop is adapted to maintain a pipeline end face and a flange section end face of a flange section of the pipe connector flush with one another during expansion by the pressure tool.

* * * * *